(No Model.)  B. SCOTT.  5 Sheets—Sheet 1.
CORN PLANTER.

No. 293,365.  Patented Feb. 12, 1884.

WITNESSES:
Fred. G. Dieterich
Jos. E. Ryan

INVENTOR.
Benjamin Scott
By DeWitt C. Allen
ATTORNEY (No Model.)  5 Sheets—Sheet 2.

B. SCOTT.
CORN PLANTER.

No. 293,365.  Patented Feb. 12, 1884.

WITNESSES:  INVENTOR.

(No Model.) 5 Sheets—Sheet 3.

B. SCOTT.
CORN PLANTER.

No. 293,365. Patented Feb. 12, 1884.

WITNESSES:
Fred. G. Dieterich
Jos. E. Ryad

INVENTOR.
Benjamin Scott
DeWitt C. Allen
ATTORNEY

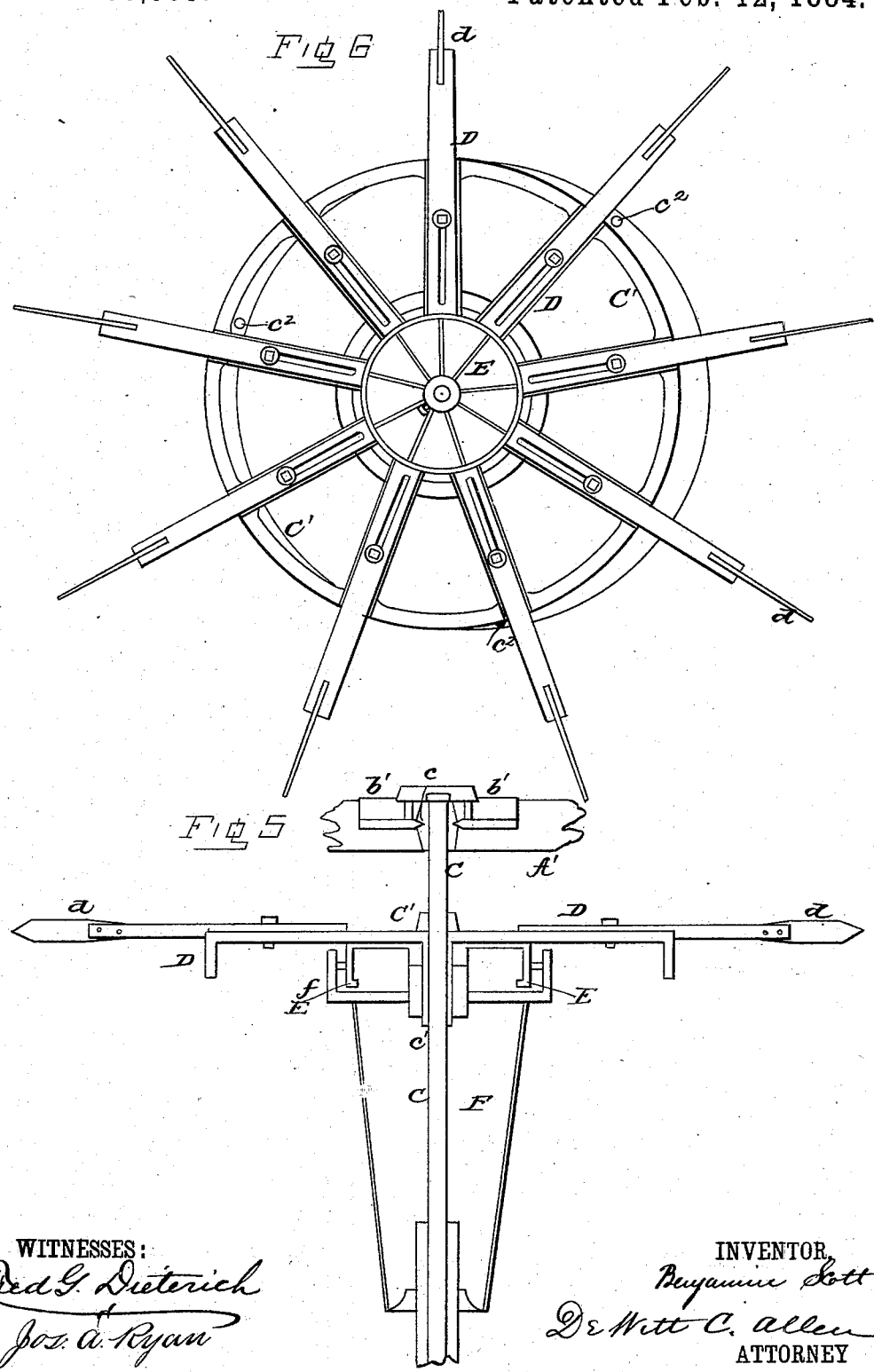

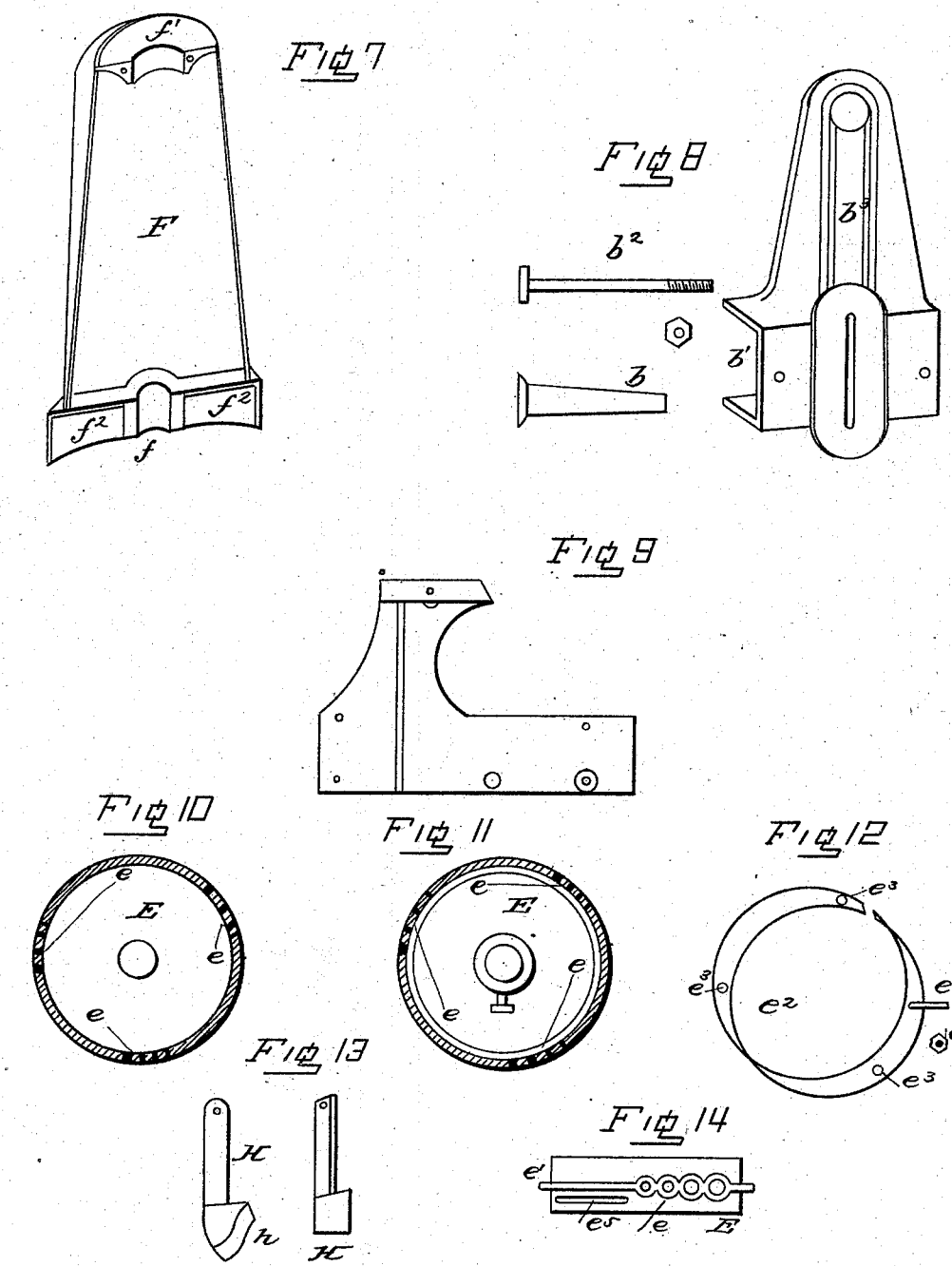

UNITED STATES PATENT OFFICE.

BENJAMIN SCOTT, OF BLOOMINGTON, ILLINOIS.

CORN-PLANTER.

SPECIFICATION forming part of Letters Patent No. 293,365, dated February 12, 1884.

Application filed May 29, 1883. (No model.)

*To all whom it may concern:*

Be it known that I, BENJAMIN SCOTT, of Bloomington, in the county of McLean, and in the State of Illinois, have invented certain new and useful Improvements in Corn-Planters; and I do hereby declare that the following is a full, clear, and exact description thereof, reference being had to the accompanying drawings, and to the letters of reference marked thereon, making a part of this specification, and in which—

Figure 1:
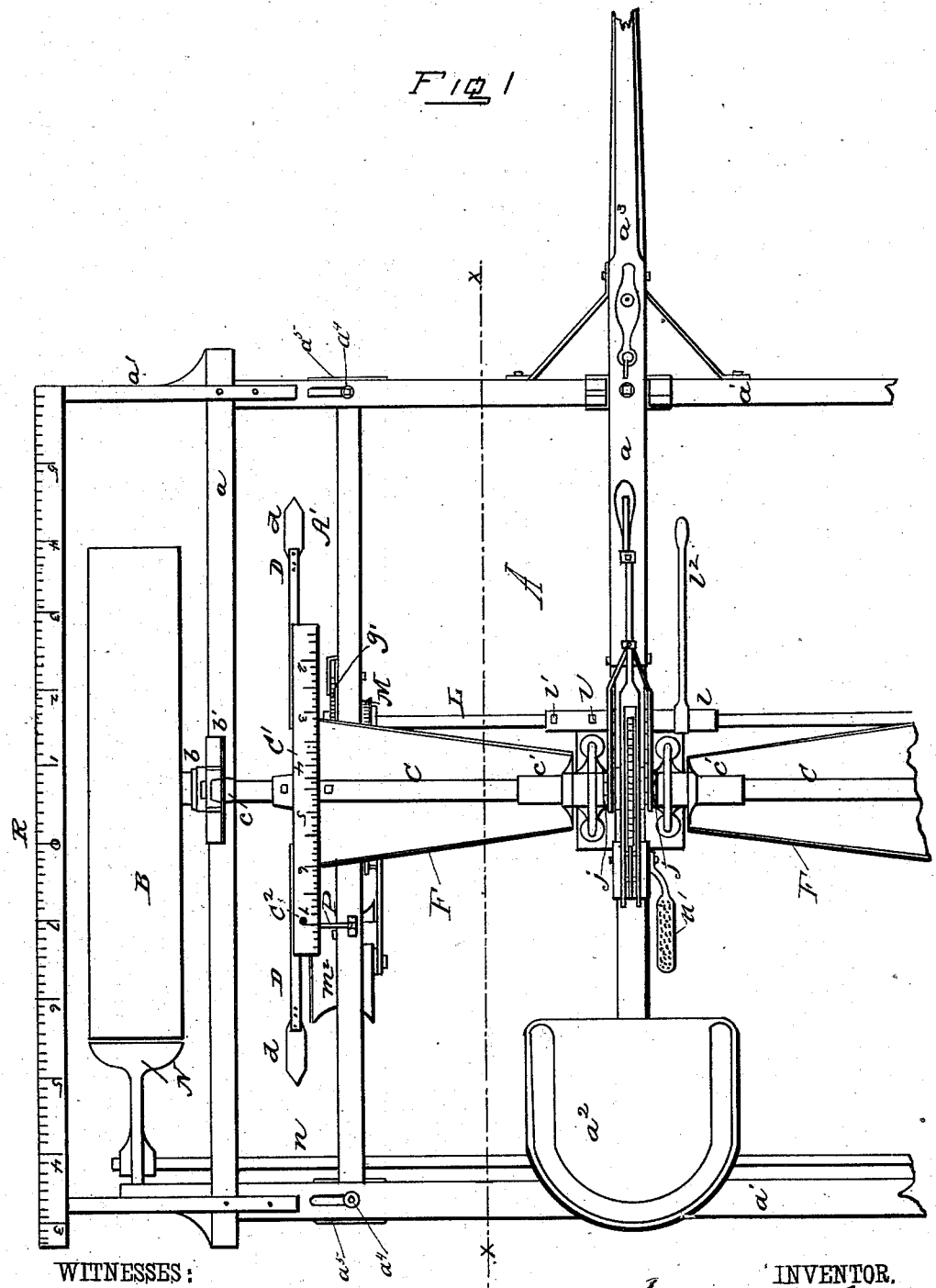
Figure 2:
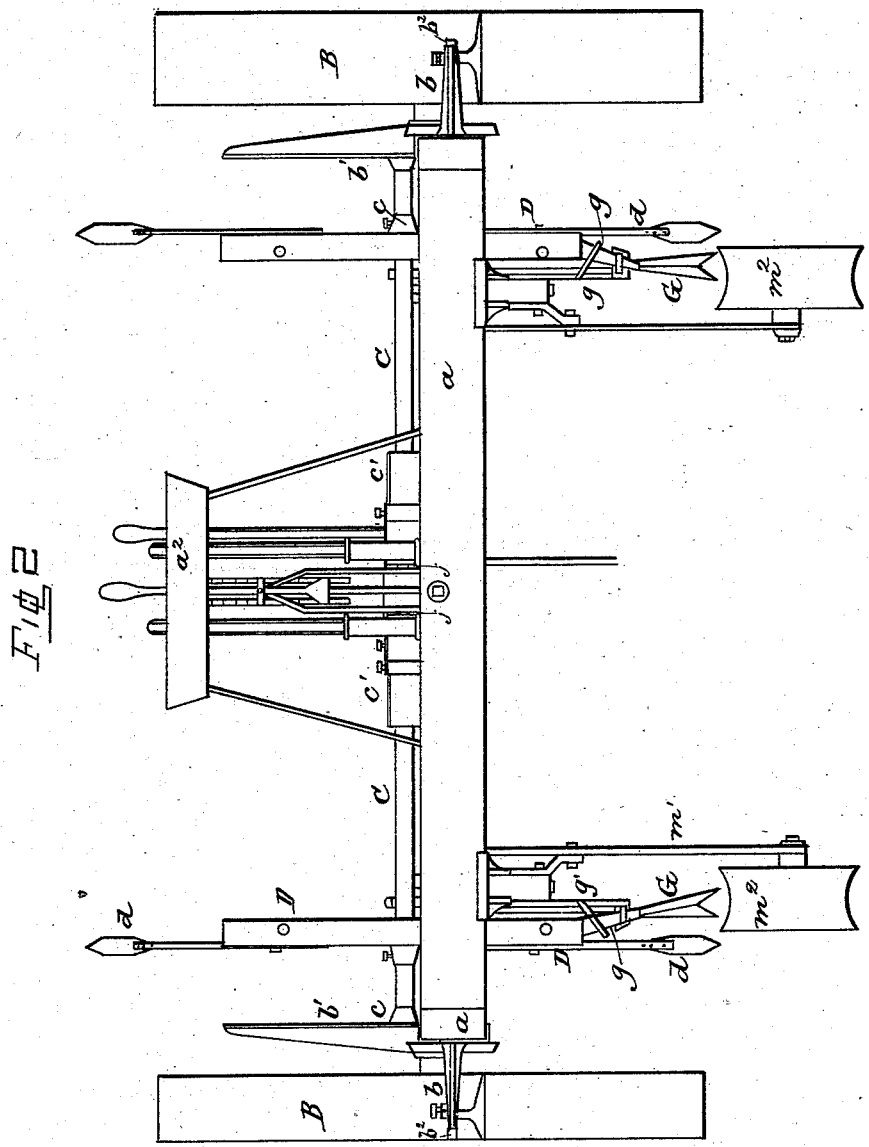
Figure 3:
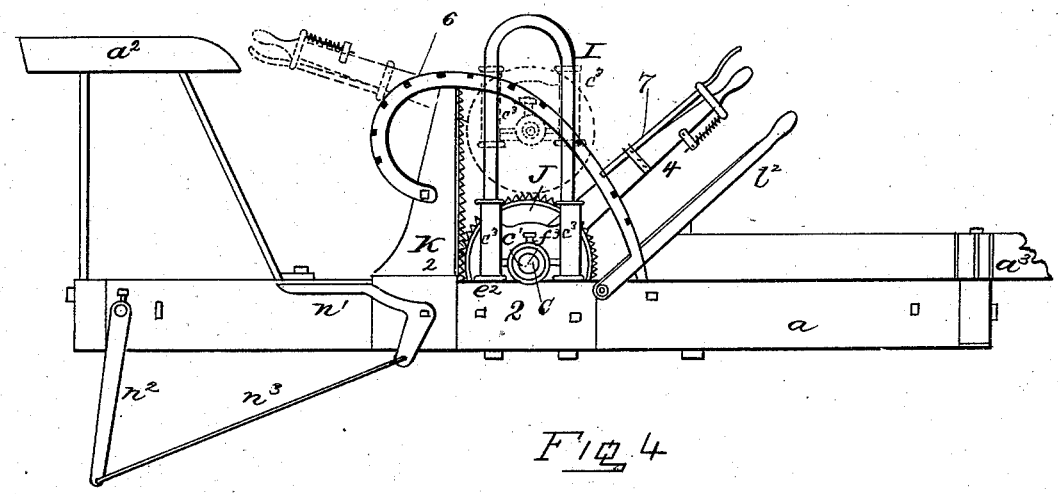
Figure 4:
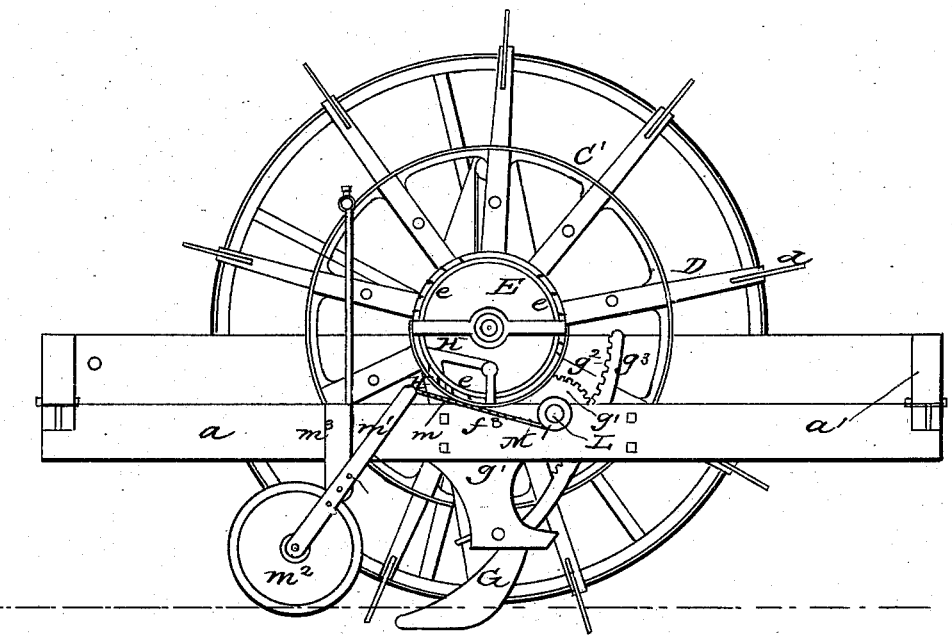

Figure 1 represents a top view or plan of my improved machine; Fig. 2, a rear elevation of the same; Fig. 3, a side elevation of the left side of the machine, or sectional view through the line $x\,x$ of Fig. 1; Fig. 4, a longitudinal vertical central section; Figs. 5, 6, 7, 8, 9, 10, 11, 12, 13, and 14, sectional and detail views to be hereinafter referred to.

This invention relates to certain new and useful improvements in machines for planting corn at any desired width between the rows, so that the corn can be planted both ways without the aid of ropes, wires, check-lines, or hand-levers; and the four important features of the invention are, first, in an automatic sulky corn-planter adapted to work on uneven surfaces; secondly, in an automatic revolving drop; thirdly, in a mathematical indicator that will at all times denote the starting-point of the machine; and, fourthly, in the mechanism for raising the operating parts of the machine; and to this end the invention consists in novel features of construction and combination and arrangement of parts, all as will be hereinafter fully described, and set forth in the claims hereto annexed.

In the drawings, A represents the main frame of the machine, composed of the longitudinal beams $a\,a\,a$ and transverse beams $a'\,a'$. Upon the rear end of the central beam $a$ is mounted the driver's or operator's seat $a^2$, and to the front end of said beam and transverse beam $a'$ is secured the draft-pole or tongue $a^3$ by a fastening-bolt and braces, in the usual manner.

A' A' represent longitudinal beams, connected to the transverse slotted beams $a'\,a'$ by bolts $a^4$ and castings $a^5$, all as clearly shown in Fig. 1. These beams carry and support the operating machinery, and can be adjusted laterally to plant corn at any desired width between rows.

B B represent the supporting-wheels, mounted on adjustable spindles $b\,b$, connected to the vertically-slotted castings $b'\,b'$ (which are secured to the outer beams, $a\,a$) by means of screw-bolts $b^2$, the stems of which extend outward and pass through the spindles and hubs of the supporting-wheels, when screw-nuts put on the ends of said screw-bolts will press the spindles against said castings, and hold them firmly in position while permitting the supporting-wheels to revolve thereon, as clearly shown in Figs. 1 and 9. By loosening said nuts the spindles and wheels can be vertically adjusted to raise or lower the frame, for a purpose to be hereinafter described.

$c\,c$ represent boxes with V-shaped notches on sides and bottom, (see Fig. 5,) and which are adapted to be vertically adjusted in the slots $b^3\,b^3$ through the upper portions of the castings $b'\,b'$.

C represents the main shaft, journaled in said boxes $c\,c$, and passing through the hubs of flanged disks C' C' and hollow tube $c'$, said tube passing through the central castings, 2 2, and secured thereto by set-screws. The disks C' C' are closed on one side, and adjustably connected to the shaft C by set-screws, so as to be laterally adjusted thereon, and are provided with a series of radiating adjustable arms or spokes, D, having steel points $d$, that engage the ground, and form, in connection with the disks C' C', the motive power for operating the corn-dropping mechanism. The longitudinal adjustment of the spokes D permits of the corn being dropped at longer or shorter distances apart, and whenever adjusted the supporting-wheels should also be vertically adjusted to correspond with the adjustment of the spokes, so that the latter will have at any adjustment the same uniform bearing or engagement with the ground.

E' E represent flanged disks, having one of their sides closed, and arranged inside of and secured to the hubs of the disks C' C' by set-screws. The disks E E are provided with oblique holes $e$ through them, and arranged in three divisions of four holes each, and at equal distances apart, the holes in each division varying in size from one-half to one-sixteenth inch, the smaller holes being arranged uniformly in advance of the larger ones, all as clearly shown in Figs. 10, 11, and 14. The flanges or rims of the disks E E are provided with circular recesses $e'$ (see Fig. 14) on their inner surfaces, into which are sprung bands $e^2 e^2$, (see Fig. 12,) corresponding with the interior circumference of said disks. These bands are provided with three holes, $e^3$, of the same size as the largest holes, $e$, through disks E, and at equal distances apart, and are adjustably secured in said disks by threaded bolts $e^4$, secured thereto, and working through slots $e^5$ in the flanges of said disks, and secured in any desired position by screw-nuts $e^6$. By moving the bands $e^2$ around in the disks E, the holes will cover any of the different-sized holes in said disks, and thereby regulate the number of grains of corn desired to be dropped to form a hill.

F F represent troughed or semicircular shaped hoppers, tapering and inclining downward from their inner toward their outer or enlarged ends. These hoppers are provided with bearings $f f'$ for the reception of the shaft C, and the bearings $f$ are secured on hubs of disks C′ C′ and against the hubs of disks E by collars $f^2$ inside of hubs of disks C′, secured by set-screws, so that the bearings $f$ will work between the hubs of disks E and collars $f^2$. The bearings $f'$ at the smaller or inner ends of said hoppers are placed on the hollow tubes $c'$, bearing against the castings 2, and secured on the hollow tubes by set-screws, by which the hoppers are held in position, while the hubs of disks E revolve inside of the bearings $f'$ and the hubs of disks C′ outside of them. The inclined and tapering form of hoppers permits the corn to pass inside of the disks E, which are on the same level as the hoppers, which have rabbets or offsets $f^2$ on their enlarged ends, (see Fig. 7,) which fit outside of and around the lower half ends of said disks E, and which rabbets or offsets connect with pipes or conductors $f^3$, (see Fig. 3,) extending downward inside of the flanges or rims of the disks C′, so that the corn passing through disks E is discharged inside of the flanges or rims of the disks C′, which have three holes, $c^2$, through them, arranged at equal distances apart, but alternating with the holes through disks E, the corn lying in the flanges of the disks C′ C′ until they come around opposite the pipes or conductors $g$, (secured to castings $g'$,) through which the corn is discharged, and falls down through the heels of the cutters G into the furrows formed by said cutters.

H represents hammers, (shown in Fig. 4 and detail views, Fig. 13,) which are pivoted at their ends inside of the centers of the hoppers F, and their larger ends resting in the disks E, and having beveled shoulders $h$ on their under sides inclining toward the hoppers, so that as the disks E fill any one of the three holes $e^3$ in bands $e^2$ with corn in passing under the center or bottom of the hoppers the beveled shoulders on hammers will throw any loose corn back toward the centers or bottoms of the hoppers, while the corn in said holes will pass downward through the holes in disks E and into and be discharged through pipes or conductors $f^3$ onto the flanges or rims of the disks C′. Should any of the holes in bands $e^2$ be very full of corn, or the grains stand up on ends, the hammer H will be raised and pass the corn under and immediately fall back into position without cutting the corn, while obviating clogging of the holes in said bands and disks.

The drawings are made to represent the machine adjusted to its narrowest capacity, so that when it is desired to adjust the mechanism to plant corn with the rows farther apart the bolts or set-screws on the beams A′ A′ are loosened, as also the set-screws of hoppers and disks C′, when the beams, hoppers, and disks C′ can be moved outward on the shaft C, the smaller ends of hopper being of sufficient length to move on the hollow tubes $c'$.

I I represent two half-circular or bent wrought-iron rods or bows, the lower threaded ends of which pass down through holes in the castings 2, and blocks bolted on central beam, $a$, and secured in position by screw-nuts.

$j\ j$ represent the hubs of a gear-wheel, J, having hexagonal ends, (see Figs. 1 and 2,) upon which are sprung the forked ends of a lever, 4, having hexagonal openings through them, and which forked ends form a connection between said hubs.

K represents a vertical toothed bar meshing with gear-wheel J, so that when lever 4 is pulled backward the gear-wheel will be revolved and travel up said toothed bar, thereby raising tube $c'$ and castings 2, having tubes $c^3$, mounted on and sliding up the guide-rods I, carrying with it the shaft C, thereby raising all that is connected to it, being the hoppers and disks C′ and E, while the boxes $c$ travel up the vertical slots $b^3$ in castings $b'$, and the spring-latch 7 on lever 4, engaging any of the notches in curved bar 6, will hold said lever at any desired point, all as clearly shown in dotted lines Fig. 4, and by means of which the operating and corn-dropping mechanisms are raised out of the ground in turning the machine at the ends of the field.

L represents a sectional shaft, the inner ends of which are connected together by a tubular coupling, $l$, and set-screws $l'$, while the outer ends are journaled in and extend beyond the beams A′. The object of the coupling is to lengthen or shorten the shaft L in accordance with the adjustment of machine, to plant the corn in different-width rows. Upon said coupling $l$ is mounted a lever, $l^2$, secured thereon by a set-screw, and upon or near the outer ends of the shaft L, and inside of the beams A′, are mounted pulleys M M, connected to and over which pass cords or wires $m\ m$, also connected to levers $m'\ m'$, carrying at their lower ends the covering-wheels $m^2\ m^2$, having the usual concave outer surfaces. The levers $m'$ $m'$ are provided near their centers with a series of holes, by which they are adjustably and pivotally connected to the castings $m^3$ $m^3$, all as clearly shown in Figs. 2 and 3. Upon the outer ends of the shaft L, which extend through and beyond the beams A', are securely mounted small gear-wheels $g'$, which mesh with the teeth $g^2$ upon the inner and upper curved extensions, $g^3$, of the cutters G. By pulling lever $l^2$ backward, the shaft L will be turned so that the small gears will lift the cutters out of the ground, as also the covering-wheels, through the medium of the pivoted levers, connecting cords or wires, and the pulleys mounted on the sectional shaft, all of which is done when turning the machine at the ends of the rows.

N N represent the scrapers, connected to the cross-shaft $n$ by set-screws, said scrapers being thrown into or out of engagement with the supporting-wheels by the foot-lever $n'$, connected to said cross-shaft, through the medium of lever $n^2$ and connecting-rod $n^3$.

On the face of disks C', and on the bars R R, connected to the outer ends of the transverse bars $a'$ $a'$ of the frame, are arranged numbers 0 1 2 3 4 5 6 7, with fractional marks between them, the numbers 0 0 denoting the dropping-points. As each disk C' has three dropping-holes, said numbers are arranged on the outer face of the disk between each of said dropping-holes, and, in connection with the stationary pointers P P, the machine can be set at the ends of the rows without backing it up. When going out at the ends of the rows, a stake is set opposite the last hill dropped, and the machine turned around and driven forward until one of the numbers on the bars R comes opposite the stake. Supposing the machine is stopped at number 5, which is opposite the stake, the machine already standing at its dropping-points, which will leave the stake five numbers ahead of the dropping-point 0, the disks C' C' are rotated until number 5 comes opposite to the pointers P, when the dropping mechanism is let down (through the medium of lever 4) until the shaft C, with its boxes, rests on the castings $b'$ at the bottom of the slots $b^3$, and in starting the machine it will drop the corn opposite the stake. In case the machine has passed the stake and the dropping-point 0 on the bars R is five numbers forward of the stake, leave number 5 standing at the same point it was set for dropping five numbers forward, and the machine will drop at the second hill in front of the stake, which hill will be opposite the numbers 3 on the bars R before the machine starts forward.

Further description of the operation of my improved machine is deemed unnecessary, it being obvious from the foregoing.

Having thus fully described my invention, what I claim as new, and desire to secure by Letters Patent, is—

1. In a corn-planter, the circular flanged dropping-disks C', provided with a series of radiating spokes, D, for engaging the ground and revolving said disks, substantially as herein shown and described.

2. In a corn-planter, the combination of the dropping-disks C', having adjustable spokes D for engaging the ground, and the vertically-adjustable supporting-wheels, substantially as and for the purpose herein shown and described.

3. In a corn-planter, the combination, with the revolving flanged dropping disk or disks C', of the interior flanged disk or disks E, having a series of holes through its flange or flanges arranged in a series of divisions at equal distances apart, substantially as and for the purpose herein shown and described.

4. In a corn-planter, the combination, with the revolving flanged disk or disks C', of the interior flanged disk or disks E, having a series of oblique holes through its flange or flanges arranged in a series of divisions of holes at equal distances apart, substantially as and for the purpose herein shown and described.

5. In a corn-planter, the combination, with the revolving flanged disk C', of the interior flanged disk, E, having a series of holes through its flange arranged in a series of divisions at equal distances apart, and the series of holes in each division varying in size uniformly in advance of the larger ones, substantially as and for the purpose herein shown and described.

6. In a corn-planter, the circular recessed flanged disk E, having a series of holes through its flange arranged in a series of divisions at equal distances apart, and the series of holes in each division varying in size uniformly in advance of the larger ones, in combination with an interior adjustable band, $e^2$, having a series of single holes through it for each division of holes in disk E, and of the same size as the largest hole in each division, substantially as and for the purpose herein shown and described.

7. In a corn-planter, the combination of the disk E and a semicircular or troughed shaped inclined and tapering hopper, F, having its enlarged end communicating with said disk, substantially as and for the purpose herein shown and described.

8. In a corn-planter, the combination of the disk E and a semicircular or troughed shaped inclined and tapering hopper, F, having its enlarged end communicating with said disk, and provided with an offset or rabbet, $f^2$, which fits outside of and one-half around the disk, substantially as and for the purpose herein shown and described.

9. In a corn-planter, the combination, with the disk E, of the inclined and tapering hopper, having a hammer, H, pivoted therein, with its larger end extending inside of said disk, and having a beveled shoulder, $h$, inclining toward said hopper, substantially as and for the purpose herein shown and described.

10. In a corn-planter, the combination of the flanged dropping-disks C' E and hoppers F, arranged on opposite sides of the central beam $a$, and adapted to be adjusted toward and from each other, substantially as and for the purpose herein shown and described.

11. In a corn-planter, the combination of the shaft C, carrying the dropping mechanism, journaled in boxes $c$ $c$, castings $b'$ $b'$, having vertical slots for the reception of said boxes, hollow tube $c'$, castings 2, having vertical tubes $c^3$, bent or curved guide-rods I, toothed bar K, gear-wheel J, and lever 4, for operating said gear in raising and lowering the dropping mechanism, substantially as herein shown and described.

12. In a corn-planter, the gear-wheel J, having hexagonal hubs $j$ $j$, in combination with the lever H, having forked arms with hexagonal openings through them, by which they are adapted to be sprung on said hubs, substantially as and for the purpose herein shown and described.

13. In a corn-planter, the combination of the laterally-adjustable beams A' A', sectional shaft L, journaled in said beam and adjustably coupled together, and carrying the operating-lever $l^2$, gear-wheels $m^2$, and pulleys M, and mechanism for connecting said gear-wheels and pulleys with the cutters and covering-wheels, substantially as and for the purpose herein shown and described.

In testimony that I claim the foregoing I have hereunto set my hand this 23d day of February, 1883.

BENJAMIN SCOTT.

Witnesses:
THOS. SLADE,
IRVING UNDERHILL.